United States Patent
Everson, Jr. et al.

[15] 3,671,013
[45] June 20, 1972

[54] AIRCRAFT HANGARING SUPPORT

[72] Inventors: Kirke B. Everson, Jr., R.F.D. 2, P. O. Box 471; Stefan F. Eisen, R.F.D. 2, P. O. Box 516, both of Danielson, Conn. 06239

[22] Filed: May 25, 1970

[21] Appl. No.: 40,095

[52] U.S. Cl. .................................................254/8 R
[51] Int. Cl. ...................................................B60p 1/48
[58] Field of Search..............254/2, 3, 8, 120, 124, 126, 254/127, 131; 214/1 D, 1 A; 269/55, 58

[56] References Cited
UNITED STATES PATENTS 2,777,667  1/1957  Stafford ..........................254/127 X Primary Examiner—Andrew R. Juhasz
Assistant Examiner—David R. Melton
Attorney—Barlow and Barlow

[57] ABSTRACT

An aircraft hangaring support having a base framework mounted on rollers, the framework having pivotally attached thereto arms carrying aircraft wing engaging means, the arms being mechanically pivoted to raise the aircraft fuselage by the wings.

5 Claims, 3 Drawing Figures

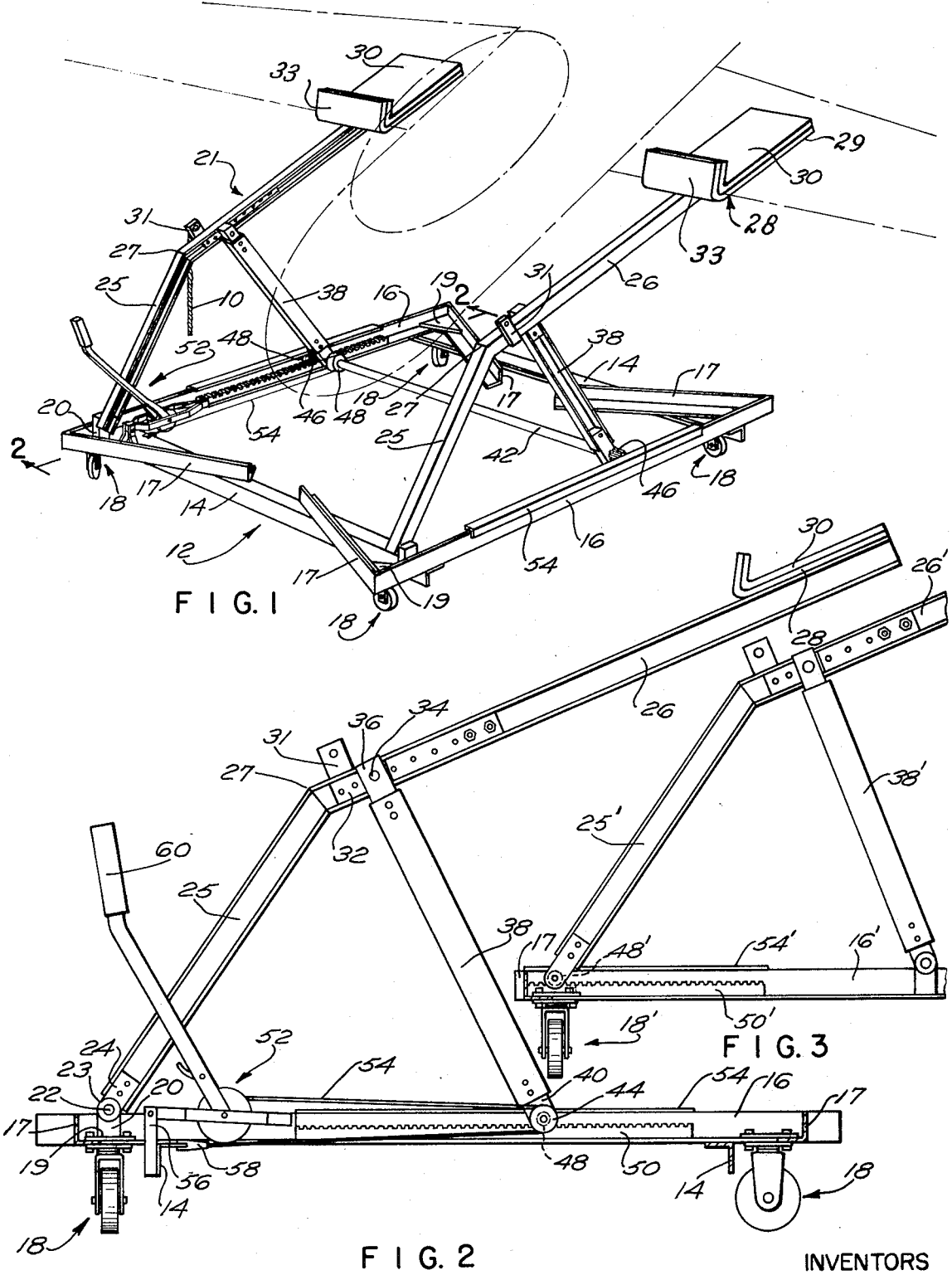

AIRCRAFT HANGARING SUPPORT

BACKGROUND OF THE INVENTION

The invention relates to a device for stacking sail planes or gliders to substantially reduce the space required for storage purposes.

A major problem today for the private airplane or sail plane owner is the limited amount of hangar space available. This, in turn, skyrockets the price which is charged for the rental of the available hangar space. Usually they charge by the number of square feet occupied, and this works an additional hardship on the sail plane owner since sail planes have an extra large wing span.

Another problem involving the hangaring of an aircraft results from its lack of lateral maneuverability which necessitates several forward and backward movements in order to move the aircraft laterally into a specific location. This results in time consuming maneuvers and often use is not made of the available space.

Presently, the alternative to paying for full space for the sail plane owner is to detach the wings from his plane and to store them alongside the fuselage. As can be imagined, the assembly and disassembly of the plane is not very satisfactory.

SUMMARY OF THE INVENTION

The aircraft hangaring support is basically designed for use with sail planes whose gross weight runs in the range of 500 to 800 pounds although it could be used with heavier sail planes or with small airplanes having conventional landing gear. The arms of the support are lowered to a height at which the wing engaging members can be slid under the wings of the aircraft. After the wings are seated on the wing engaging members, a cinch belt or elastic belt extending between the support arms may be fastened across the nose of the sailplane to secure it for lifting. The winch handle is then actuated to inclinely elevate the sailplane with respect to the ground. When the sailplane is elevated to a proper angle, the aircraft hangaring support may be rolled to its storage position and the plane's inclination will allow several planes to be stacked in an area normally occupied by one sailplane.

It is an object of this invention to substantially reduce the amount of space required to hangar a sailplane.

It is also an object of the invention to greatly facilitate both forward and lateral movement of a sailplane when it is being positioned for storage.

A further object of the invention is to eliminate the need for sailplanes to be disassembled in order to hangar them at a reasonable storage rate.

DESCRIPTION OF THE DRAWINGS

FIG. 1 is a perspective view of the invention;
FIG. 2 is a cross section taken along line 2—2 of FIG. 1; and
FIG. 3 illustrates a partial view of an alternative embodiment in which the pivoted arm and the arm having the pinion gears are reversed.

DESCRIPTION OF THE PREFERRED EMBODIMENT

With reference to FIG. 1, the present invention will be described in detail. The support for hangaring an aircraft has a base 12 which may be constructed of angle iron sections such as cross-members 14 and side members 16 with end braces 17 that are welded together to provide a rigid framework. The sections could be attached to each other in any other well-known manner, and the welding of them together is merely illustrative. Casters 18 are mounted on the underside of the base at its four corners to facilitate moving the aircraft support around in its hangar. Corner plates 19 are provided between side members 16 and braces 17 to give additional rigidity to the base.

Mounted at the forward end of the base are a pair of laterally spaced brackets 20 which are seated on the horizontal flanges of the angle iron side members 16. Arms 21 are pivoted to the brackets 20 by pins 22 journaled in horizontal bores bassing through brackets 20, the inner ends of the pins being journaled in hubs 23 at the lower end of blocks 24 which are secured to the lower arm section 25, which arms have a channel shaped cross-section in which the blocks seat. Arm sections 25 and 26 are preferably angularly related as at joint 27 and along the top surface of the free ends of the upper arm sections 26 are mounted J-shaped metal wing engaging members 28 which have cushioning padding 30 attached to the surface which engages the wings of an aircraft. The J-shaped metal wing engaging members have their long surfaces 29 mounted on said arm sections with their short curved surfaces 33 extending upwardly from the top surface of said arm sections. Phantom lines indicate a sail plane in position on the wing engaging members 28.

To elevate arms 21, a lever arm 38 rises from base 12. Arms 38 are pivoted to a block 32 which is mounted in the channel cross-section and attached thereto by bolts just above the joint 27 and on each of the upper arms 26. The blocks 32 are adjustable in the channels and may be bolted to the upper arms 26 at various positions along their channels above the joint. The position of blocks 32 allows for an adjustability of the lowest position to which the arms with the wing engaging members 28 may be lowered where the height off the ground of the wings of various aircraft differs and also affects the greatest angle to which the aircraft can be elevated with respect to the surface the base rests upon. Pivotal adjustment of arms 38 is provided by a pin 34 journaled in aligned bores of block 32 just described, which pin is held by block 36 seated and bolted in the channel cross-section of lever arm 38. A block 40 is also seated and bolted to the lower end of lever arm 38, and passing through bores in the lower end of the blocks 40 is a shaft 42. Mounted on the shaft is a pulley 44, pinion gears 46 and rollers 48. The pinion gears ride along rack bars 50 which are mounted upon the horizontal flanges of side members 16 in response to the operation of the winch mechanism 52 as will presently appear. Guard members 54 are provided to make contact with rollers 48 if the pinion gears should attempt to rise up out of the teeth on the rack bar.

The winch mechanism 52, which provides the motive force for raising and lowering the aircraft, is of a design well known in the industry and will not be described in detail except to state that it has double-acting ratchet which controls both forward and reverse winding of the cable 54. A bracket 56 mounts the winch mechanism to the front cross member 14. The cable wrapped on the winch passes around pulley 44 on shaft 42, and the free end is anchored to the horizontal flange of the front cross member 14 by dead end 58. As the cable is wound upon the winch by actuating the handle 60, the shaft is pulled forward with the pinion gears riding forward along the rack bar, and the lever arm in turn forces arms 21 supporting the aircraft to angularly raise. By unwinding the cable from the winch, the operation reverses itself, and arms 21 supporting the aircraft are angularly lowered.

Mounted on the upper arm sections are brackets 31 having apertures therein. Their purpose is to stabilize the sailplane while being elevated. A rope or cable 10 may be strung over the nose of the sailplane between the two brackets to hold it down during the early angles of inclination. Other methods of holding the nose down would be a cinch strap arrangement or the use of an elastic belt connected between the two arms.

FIG. 3 illustrates an alternative elevating structure in which the arms that are pivotally connected to the base and the arms that have pinion gears engaging the rack have been reversed. As shown, lever arm 38' is pivotally attached to the side member 16' and lower arm section 25' has a pinion gear 48' that rides along rack 50' as the aircraft is raised or lowered.

We claim:
1. An aircraft hangaring support comprising a frame including side members, a pair of laterally spaced arms, aircraft wing engaging means attached to said arms, said aircraft wing engaging means being J-shaped with its long surface mounted on said arms and its short curved surface extending upwardly from a top surface of said arms, means for pivoting said arms about said frame whereby when said arms are pivoted upwardly an aircraft whose wings would be engaged in said wing engaging means will have the nose of its fuselage inclined toward the ground and the amount of hangar floor space required for storage will be greatly reduced.

2. An aircraft hangaring support comprising a frame including side members, a pair of laterally spaced arms, aircraft wing engaging means attached to said arms, means for pivoting said arms about said frame whereby when said arms are pivoted upwardly an aircraft whose wings would be engaged in said wing engaging means will have the nose of its fuselage inclined toward the ground and the amount of hangar floor space required for storage will be greatly reduced, said means for pivoting said arms about said frame comprises a pair of laterally spaced lever arms, each one being pivotally attached at one end to one of said arms, said pair of lever arms having means attached at their other ends to engage said frame.

3. An aircraft hangaring support as recited in claim 2 wherein said frame has rack bars secured to the side members and one of said pair of arms have pinions which engage the laterally spaced rack bars mounted on said frame.

4. An aircraft hangaring support as recited in claim 2 wherein said frame has rollers mounted thereunder to provide ease of moving the frame around.

5. An aircraft hangaring support as recited in claim 2 wherein the other ends of said pair of lever arms further comprises a shaft connected therebetween and journaled therein and having a pulley mounted thereon, and includes a winch mounted at the forward end of said frame having a cable passing therefrom out around said pulley and back to a position at the forward end of said frame where the end of the cable is attached.

* * * * *